United States Patent
Kubota et al.

(10) Patent No.: US 9,330,346 B2
(45) Date of Patent: May 3, 2016

(54) PRINTING DEVICE, PRINTING METHOD FOR PRINTING DEVICE, AND PRINT MEDIUM

(71) Applicant: Seiko Epson Corporation, Tokyo (JP)

(72) Inventors: Tomoyuki Kubota, Matsumoto (JP); Naohiko Aoyagi, Azumino (JP); Yasumasa Nakajima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/659,892

(22) Filed: Mar. 17, 2015

(65) Prior Publication Data

US 2015/0278645 A1      Oct. 1, 2015

(30) Foreign Application Priority Data

Mar. 25, 2014   (JP) ................................. 2014-062317

(51) Int. Cl.
  *G06K 15/02*   (2006.01)
  *B41J 3/407*   (2006.01)
  *B41J 2/32*    (2006.01)

(52) U.S. Cl.
  CPC ................ *G06K 15/024* (2013.01); *B41J 2/32* (2013.01); *B41J 3/4075* (2013.01); *G06K 15/1878* (2013.01); *B41J 2202/37* (2013.01)

(58) Field of Classification Search
  USPC ........................................................ 358/1.8
  See application file for complete search history.

(56) References Cited

U.S. PATENT DOCUMENTS

| | | | | |
|---|---|---|---|---|
| 5,575,573 A | * | 11/1996 | Ito | B41J 3/4075 400/61 |
| 5,681,123 A | * | 10/1997 | Yamaguchi | B41J 3/46 400/582 |
| 5,904,108 A | * | 5/1999 | Tanaka | B41J 3/407 112/102.5 |
| 5,951,174 A | * | 9/1999 | Handa | B41J 3/4075 400/120.01 |
| 6,092,947 A | * | 7/2000 | Nunokawa | B41J 11/26 400/61 |
| 6,182,565 B1 | * | 2/2001 | Takayama | B41J 3/407 101/35 |
| 7,246,824 B2 | * | 7/2007 | Hudson | G09F 3/0294 283/72 |
| 7,429,414 B2 | * | 9/2008 | Nagae | B41J 3/4075 374/E11.018 |
| 8,441,654 B2 | | 5/2013 | Kurashina | |
| 2008/0267689 A1 | * | 10/2008 | Soller | A47L 1/15 401/264 |

FOREIGN PATENT DOCUMENTS

| | | |
|---|---|---|
| JP | 2002-23637 A | 1/2002 |
| JP | 2002-169468 A | 6/2002 |
| JP | 2009-217662 A | 9/2009 |

* cited by examiner

*Primary Examiner* — Allen H Nguyen
(74) *Attorney, Agent, or Firm* — ALG Intellectual Property, LLC

(57) ABSTRACT

A printing device includes a labeling information forming unit which, on a print medium where a dot group is printed in advance, selectively turns a dot of the dot group into a non-display state and thereby forms labeling information including a dot pattern.

10 Claims, 4 Drawing Sheets

PRINTING DEVICE, PRINTING METHOD FOR PRINTING DEVICE, AND PRINT MEDIUM

CROSS-REFERENCE TO RELATED APPLICATION

The entire disclosure of Japanese Patent Application No. 2014-062317, filed Mar. 25, 2014 is expressly incorporated by reference herein.

BACKGROUND

1. Technical Field

The present invention relates to a printing device for forming labeling information on a print medium, a printing method for a printing device, and a print medium.

2. Related Art

According to the related art, a printing device of this type (tape printing device) having a tape cartridge which accommodates a print tape, a cartridge loading section in which the tape cartridge is loaded, a platen drive shaft which fits with a platen roller, a tape feeding motor which rotates the platen drive shaft to reel off the print tape from the tape cartridge, a print head which carries out printing on the print tape that is reeled off, and a CPU which controls the tape feeding motor and the print head, is known (see JP-A-2009-217662). This printing device is configured to be able to prepare a label to be pasted on a cable, cord or the like. On this label, labeling information such as date and identification number is formed.

With respect to labels of this type, there is a demand that color labeling information should be formed, in order to enhance identifiability of the labeling information. For example, in preparing a label to be pasted on an electric wire or the like, in some cases, a plurality of pieces of labeling information is formed on a single label. In such cases, it is demanded that color should be changed from one piece of labeling information to another, so that the types of the plurality of pieces of labeling information that is formed (what each piece of labeling information expresses) can be identified.

However, in the related-art printing device, the print color of the printing device (color that is printable by the printing device) needs to be changed according to need, for example, by replacing the ink ribbon (color ribbon) or the like, in order to form color labeling information. Therefore, there is a problem that forming color labeling information is very troublesome. To cope with this, it is possible to configure the printing device in such a way as to be able to print in a plurality of colors. However, in this case, the configuration of the printing device is complex, or consumables used (ink ribbon and the like) are expensive.

SUMMARY

An advantage of some aspects of the invention is to provide a printing device, a printing method for a printing device, and a print medium that enable easy formation of color labeling information with a simple configuration.

A printing device according to an aspect of the invention includes a labeling information forming unit which, on a print medium where a dot group is printed in advance, selectively turns a dot of the dot group into a non-display state and thereby forms labeling information including a dot pattern.

A printing method for a printing device according to another aspect of the invention includes, on a print medium where a dot group is printed in advance, selectively turning a dot of the dot group into a non-display state and thereby forming labeling information including a dot pattern.

A print medium according to still another aspect of the invention includes a dot group printed in advance. A dot of the dot group can be turned into a non-display state by a printing device, and labeling information including a dot pattern is formed as a dot of the dot group is selectively turned into a non-display state by the printing device.

According to these configurations, since a dot or dots of the dot group are turned into the non-display state (decolorized or painted over) so as to form labeling information, the color of the labeling information depends on the color of the dot group. Therefore, by printing a color dot group in advance, it is possible to form color labeling information with the configuration of a monochrome printing device. Thus, color labeling information can be formed easily with a simple configuration.

In the printing device, it is preferable that the print medium has a plurality of the dots in respective component colors arranged and printed, as the dot group, and that the labeling information forming unit selectively turns the dots in the respective component colors into the non-display state and thereby forms the labeling information including the component colors.

According to this configuration, color labeling information made up of the respective component colors (RGB, CMYK or the like) can be formed. RGB refers to red, green, and blue. CMYK refers to cyan, magenta, yellow, and key plate (so-called process color).

Also, it is preferable that the print medium has a plurality of the dots arranged and printed in the shape of a matrix or in a zigzag shape, as the dot group.

According to this configuration, since the dots of the dot group can be arranged evenly both laterally and longitudinally, satisfactory labeling information can be formed.

In the printing device, it is preferable that a background color of at least an area where the dot group is printed, on the print medium, is a print color which is printable by the printing device, and that the labeling information forming unit overprints the dot in the print color and thereby turns the dot into the non-display state.

According to this configuration, since the dots of the dot group are selectively overprinted (painted over) in the background color so as to form labeling information, color labeling information can be formed using a monochrome printing device equipped with a monochrome ink ribbon (or ink tank).

In the printing device, it is preferable that the print medium has the dot group printed with a thermochromic ink which becomes decolorized by heating, and that the labeling information forming unit heats and decolorizes the dot and thereby turns the dot into the non-display state.

According to this configuration, since the dots of the dot group are selectively decolorized so as to form labeling information, color labeling information can be formed using an existing thermo-sensitive printing device.

In the printing device, it is preferable that the print medium has a positioning mark for relative positioning in a feeding direction with respect to the printing device, that the printing device further includes a detection unit which detects the positioning mark, and that the labeling information forming unit turns the dot into the non-display state on the basis of a result of detection by the detection unit.

According to this configuration, the dots can be turned into the non-display state accurately and labeling information can be formed accurately.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a printing device and a printing method for a printing device according to an embodiment of the invention will be described with reference to the accompanying drawings. In this embodiment, a label preparation device to which the printing device according to the invention is applied is described as an example. This label preparation device performs print processing on the print tape, cuts off the printed part of the print tape, and thus prepares a label on which labeling information is formed. In this label preparation device, it is assumed that a label to be used on an electric wire or the like is prepared. The label preparation device uses a special print tape as a print tape and thus prepares a label on which color labeling information is formed. First, the label preparation device will be described with reference to FIGS. 1 and 2.

Figure 1:
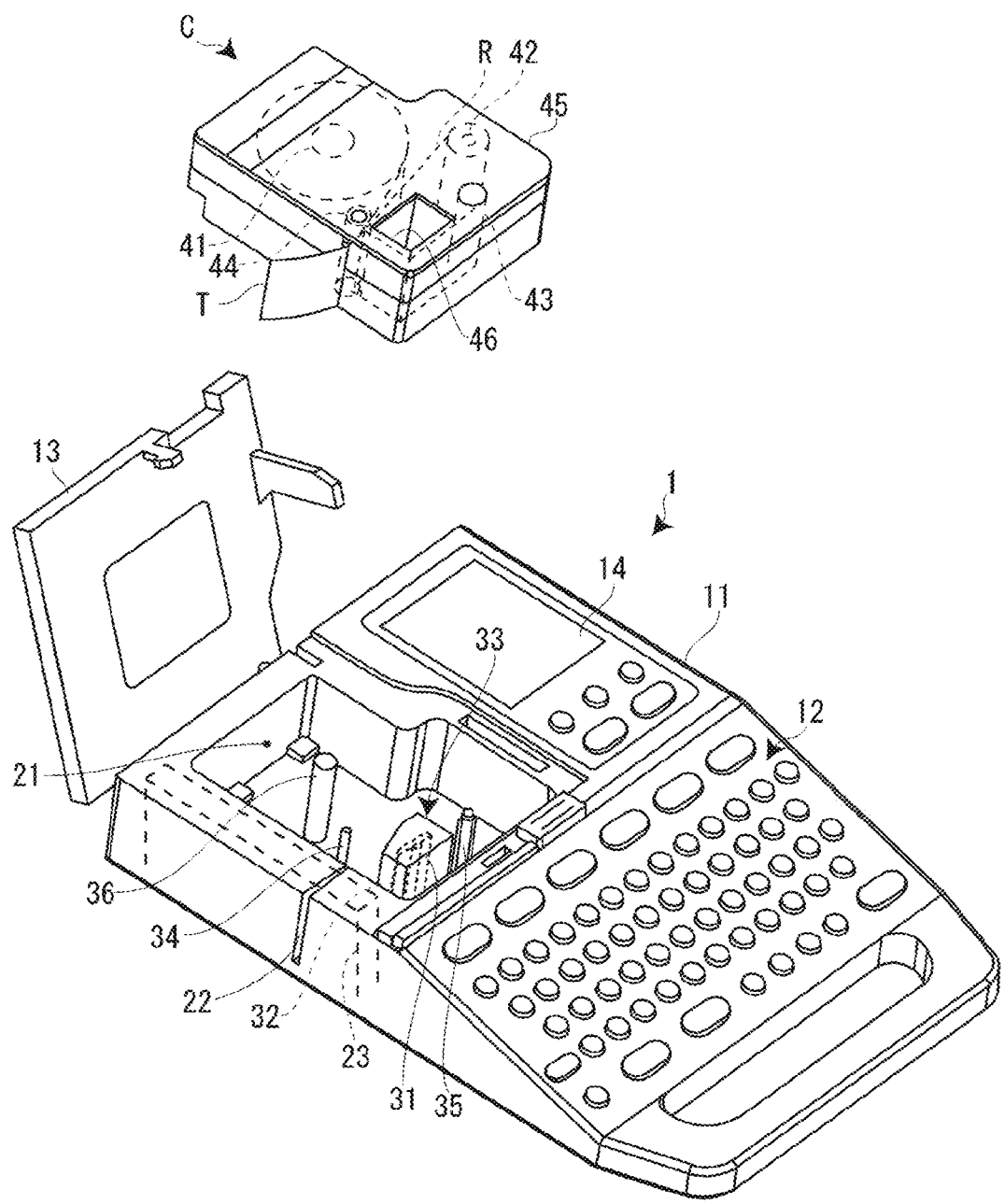
FIG. 1 is an outer perspective view showing a label preparation device according to an embodiment.

As shown in FIG. 1, a label preparation device 1 has an outer shell formed by a device case 11. A keyboard 12 is arranged broadly on the top surface of a front half part of the device case 11. On the top surface of a rear half part of the device case 11, an open/close cover 13 is arranged in a left part and a display 14 is arranged in a right part. FIG. 1 shows the state where the open/close cover 13 is opened.

Inside the open/close cover 13, a cartridge loading section 21 for loading a tape cartridge C is formed in the form of a recess. The tape cartridge C is loaded removably in the cartridge loading section 21 in the state where the open/close cover 13 is opened.

In a left lateral part of the device case 11, a tape discharge port 22 connecting the cartridge loading section 21 to outside is formed. In this tape discharge port 22, a tape cutter 23 for cutting a print tape T is present.

Meanwhile, in the cartridge loading section 21, a head unit 33 including a thermal-type print head 32 arranged inside a head cover 31, a platen drive shaft 34 standing opposite the print head 32, a take-up drive shaft 35 which reels in an ink ribbon R, described later, and a positioning protrusion 36 for a tape reel 41, described later, are provided. Below the cartridge loading section 21, a tape feeding motor 37 (see FIG. 2) which rotates the platen drive shaft 34 and the take-up drive shaft 35, as a tape carrying mechanism, is provided inside. Also, a circuit board forming a control unit 51 (see FIG. 2) which controls the tape feeding motor 37 and the like is installed inside the device case 11.

The tape cartridge C has the tape reel 41 on which the print tape T is wound, a ribbon reel 42 on which the ink ribbon R is wound, a ribbon take-up reel 43 which reels in the ink ribbon R, a platen roller 44 standing opposite the print head 32, and a cartridge case 45 accommodating these elements. In the cartridge case 45, a head opening 46 in which the head cover 31 covering the head unit 33 is inserted is formed, vertically penetrating the cartridge case 45. The color of the ink ribbon R wound on the ribbon reel 42 is the color (print color) that is printable by the label preparation device 1 in which the tape cartridge C is loaded. In this embodiment, the case where the print color is white is described as an example. Although not described in detail, the ground color of a special print tape Ts is set according to the print color (color of the ink ribbon R).

As the tape cartridge C is loaded in the cartridge loading section 21, the head cover 31 is inserted in the head opening 46, and the positioning protrusion 36 is inserted in the center hole of the tape reel 41. The platen drive shaft 34 is inserted in the center hole of the platen roller 44, and the take-up drive shaft 35 is inserted in the center hole of the ribbon take-up reel 43. With the rotational driving of the platen drive shaft 34 and the take-up drive shaft 35, the print tape T is reeled off from the tape reel 41, and the ink ribbon R is reeled off from the ribbon reel 42. Then, the print tape T and the ink ribbon R, thus reeled off, overlap with each other at the position of the head opening 46 and travel together. Subsequently, the print tape T is sent out of the cartridge case 45, and the ink ribbon R is reeled in on the ribbon take-up reel 43. In the part where the print tape T and the ink ribbon R travel together, the platen roller 44 and the print head 32 are present in the way of sandwiching the print tape T and the ink ribbon R. Thus, so-called print-and-feed is carried out.

Figure 2:
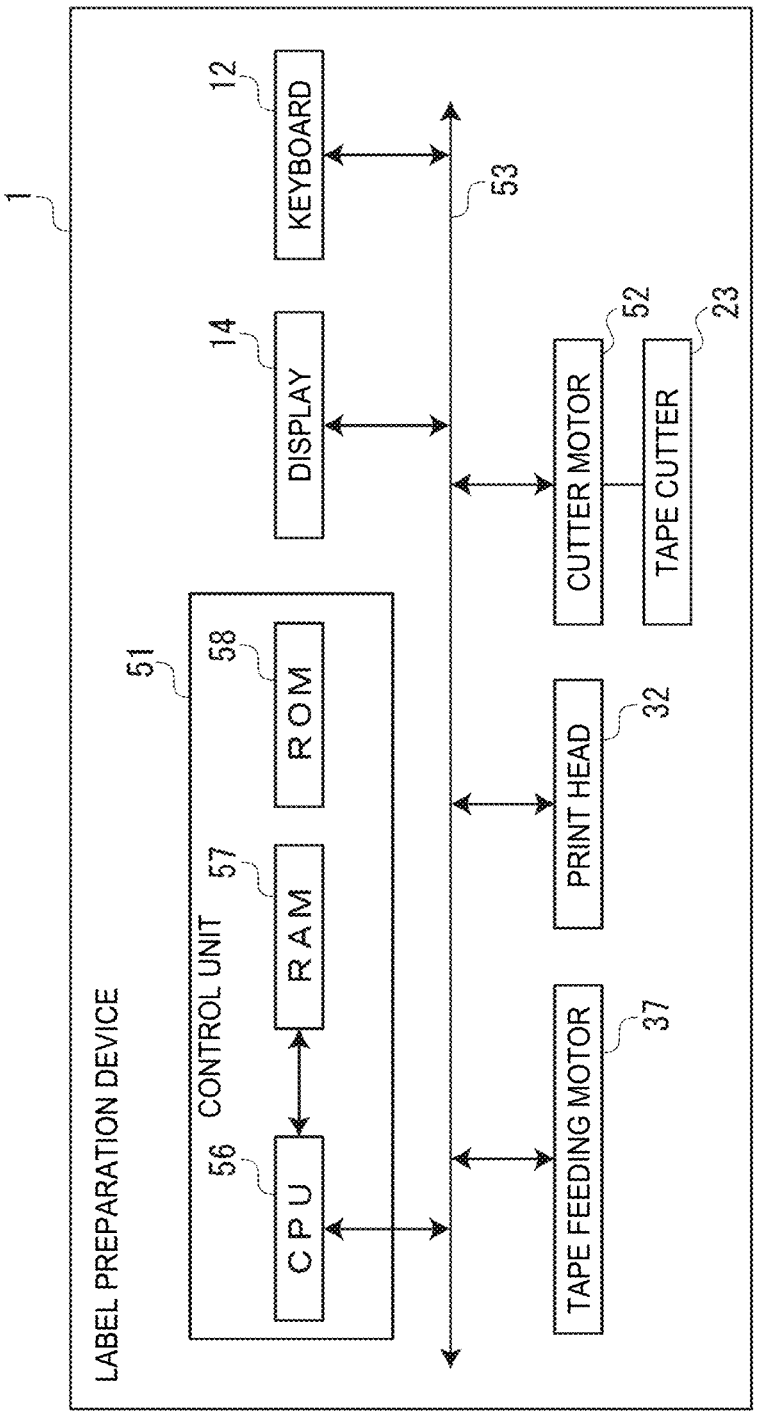
FIG. 2 is a block diagram showing the control configuration of the label preparation device.

Next, the control configuration of the label preparation device 1 will be described with reference to FIG. 2. The label preparation device 1 has the control unit 51, the display 14, the keyboard 12, the print head 32, the tape feeding motor 37, a cutter motor 52, and the tape cutter 23. These elements are connected together via a bus 53.

The control unit 51 has a CPU 56 (central processing unit), a RAM 57 (random access memory), and a ROM 58 (read only memory). The CPU 56 performs various kinds of arithmetic processing. The RAM 57 is used as a work area for the CPU 56 to perform various kinds of arithmetic processing. The ROM 58 stores a control program and control data used for the CPU 56 to perform arithmetic processing.

The display 14 functions as a display unit for displaying an editing result and print layout. The keyboard 12 functions as an input unit for the user to input information.

The print head 32 and the tape feeding motor 37 function as a print unit which performs printing on the print tape T while carrying the print tape T. The cutter motor 52 is connected with the tape cutter 23 and functions together as a cutting unit. The "labeling information forming unit" is formed by the control unit 51 and the print unit (print head 32 and tape feeding motor 37).

In the label preparation operation by the label preparation device 1, the control unit 51 generates print data D according to an input content provided via the keyboard 12, and controls the print unit (print head 32 and tape feeding motor 37) to print the generated print data D on the print tape T. Then, the control unit 51 controls the cutter motor 52 to cut the printed part of the print tape T, and thus prepares a label L.

Figure 3A:
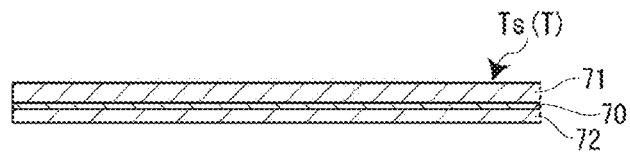
FIG. 3A is a cross-sectional view showing a special print tape.
Figure 3B:
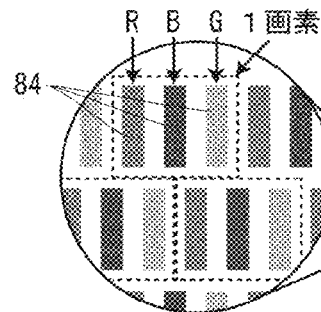
FIG. 3B is a plan view showing the special print tape.
Figure 3B:
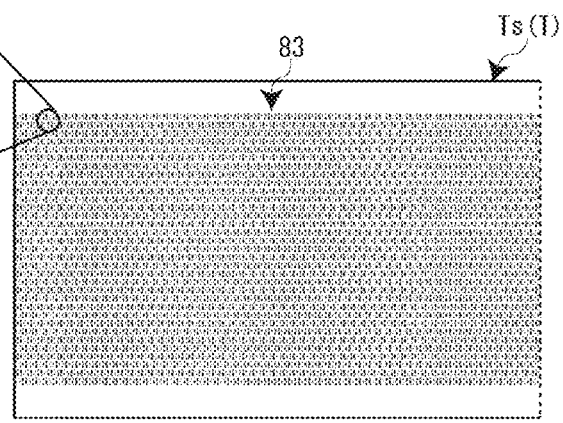
Figure 3C:
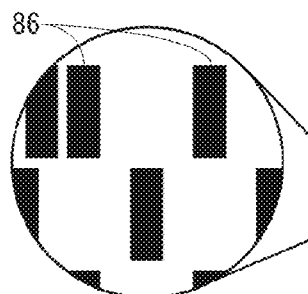
FIG. 3C shows print data to the special print tape.
Figure 3C:
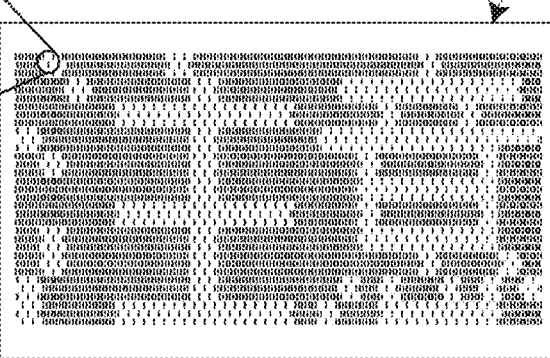

Now, a special print tape (print medium) Ts used in the label preparation device 1 will be described with reference to FIGS. 3A to 3D. As shown in FIG. 3A, the special print tape Ts has a recording tape 71 with an adhesive layer 70 formed on the back side thereof, and a release tape 72 pasted to the recording tape 71 via the adhesive layer 70. As shown in FIG. 3B, the ground color (background color) of the recording tape 71 is substantially the same (white) as the print color of the label preparation device 1, and a dot group 83 including a plurality of dots 84 in the respective colors of RGB is printed in advance on the surface of the recording tape 71. The dot group 83 is made up of the plurality of dots 84 arranged in the shape of a matrix. The respective dots 84 in the dot group 83 are arranged with a predetermined space from each other. In the dot group 83, the plurality of dots 84 in the respective colors coexists together and is arranged laterally and longitudinally. More specifically, dots 84 of R, G and B each form one pixel, and the respective pixels are arranged laterally and longitudinally. The dot group 83 is printed in a broad area in the direction of tape width, over the entire range in the direction of tape length.

In the label preparation operation in the case where the special print tape Ts is used, printing to selectively paint over dots 84 of the respective colors in the dot group 83 is performed. That is, the control unit 51 generates a print image to selectively overprint a dot or dots 84 of the dot group 83 (see FIG. 3C), as print data D. Each overprinting image 86 to overprint each dot 84 has a similar shape to the shape of each overprinting target dot 84 and has a slightly larger size than each overprinting target dot 84. Then, the control unit 51 controls the print unit (print head 32 and tape feeding motor 37) to print this print data D on the special print tape Ts.

Figure 3D:
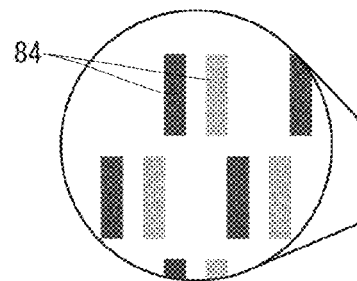
FIG. 3D shows a preparation example of a label based on the special print tape.
Figure 3D:
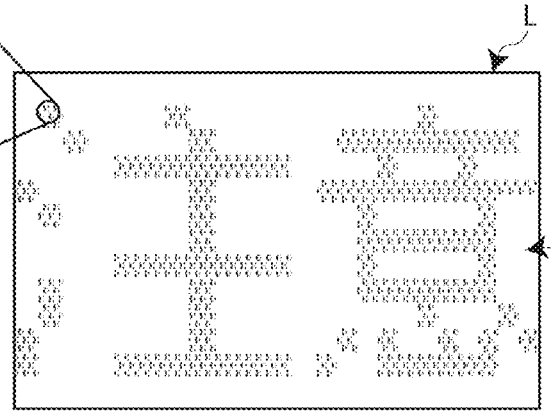

As a result, by overprinting, a dot or dots 84 are painted over in the print color and assimilated into the ground color of the recording tape 71, as shown in FIG. 3D. Thus, the dot(s) 84 in question turn into a non-display state (invisible state). As the dot(s) 84 in question turn into the non-display state, a dot pattern made up of the other dots 84 that are displayed is formed, and the labeling information 91 (Chinese characters meaning "ATTENTION") is formed. That is, by overprinting, the labeling information 91 made up of a dot pattern in which one or more dots 84 of the dot group 83 are selectively displayed is formed. Since the dots 84 of the respective colors coexisting together are selectively turned into the non-display state so as to form the dot pattern, the full-color labeling information 91 in which the dots 84 of the respective colors coexisting together are juxtaposed for color mixture is formed. In the example of FIG. 3D, all the red (R) dots 84 are painted over, whereas the green (G) and blue (B) dots 84 are juxtaposed for color mixture, thus forming the blue-green labeling information 91 (Chinese characters meaning "ATTENTION"). In this way, the color of the labeling information 91 can be changed to a desired color.

After the labeling information 91 is formed by print processing, the cutter motor 52 is controlled to perform cutting processing on the special print tape Ts. Thus, the label L on which full-color labeling information 91 is formed is prepared.

According to the above configuration, since a dot or dots 84 of the dot group 83 are turned into the non-display state so as to form the labeling information 91, the color of the labeling information 91 depends on the color of the dot group 83. Therefore, the color labeling information 91 can be formed with the configuration of a monochrome printing device. Thus, the color labeling information 91 can be formed easily with a simple configuration.

Also, as a plurality of dots 84 arranged in the respective component colors (RGB) is used as the dot group 83, the color labeling information 91 including the component colors can be formed, utilizing juxtaposition color mixture.

Moreover, since the respective dots 84 of the dot group 83 are arranged with a predetermined space from each other, the overprinting image 86 can be prevented from painting over the other dots 84 than the overprinting target even if the print position of the overprinting image 86 is slightly shifted. That is, erroneous printing over of the dots 84 due to a shift of the print position can be avoided.

Also, as the overprinting image 86 is made larger than the overprinting target dot 84, the dot 84 can be painted over even if the print position of the overprinting image 86 is slightly shifted.

In the embodiment, the plurality of dots 84 arranged in the shape of a matrix is used as the dot group 83. However, the plurality of dots 84 arranged in a zigzag shape may be used as the dot group 83.

In the embodiment, the respective dots 84 of the dot group 83 are arranged with a predetermined space from each other. However, the respective dots 84 may be arranged without any space from each other. In this case, too, it is preferable to print the overprinting image 86 that is larger than the overprinting target dot 84, in consideration of the accuracy of painting over. That is, the overprinting target dot 84 is painted over (overprinted) in the way of slightly overlapping with the dot 84 next to the overprinting target dot 84.

In the embodiment, the dots 84 of the respective colors of RGB in the dot group 83 are arranged in a triangular form. However, the dots 84 of the respective colors of RGB may be arranged in a striped form, or may be arranged in a pixilated or square form.

Moreover, in the embodiment, the area of the green (G) dots with high identifiability may be made smaller than the area of the red (R) dots and the blue (B) dots. According to this configuration, the area in white, which is the background color, becomes greater and therefore higher brightness can be achieved.

In the embodiment, the print color of the label preparation device 1 is white and the ground color of the special print tape Ts is white accordingly. However, the print color of the label preparation device 1 may be black and the ground color of the special print tape Ts may be black accordingly.

In the embodiment, RGB are used as the component colors of the labeling information 91. However, this is not limiting. For example, CMYK may be used as the component colors. Moreover, the component colors may be two colors or may be four or more colors.

In the embodiment, the dot group 83 has the dots 84 in a plurality of colors. However, the dot group 83 may have the dots 84 in a single color. In this case, the labeling information 91 in the single color of the dots 84 can be formed, though the multi-color labeling information 91 cannot be formed.

Figure 4A:
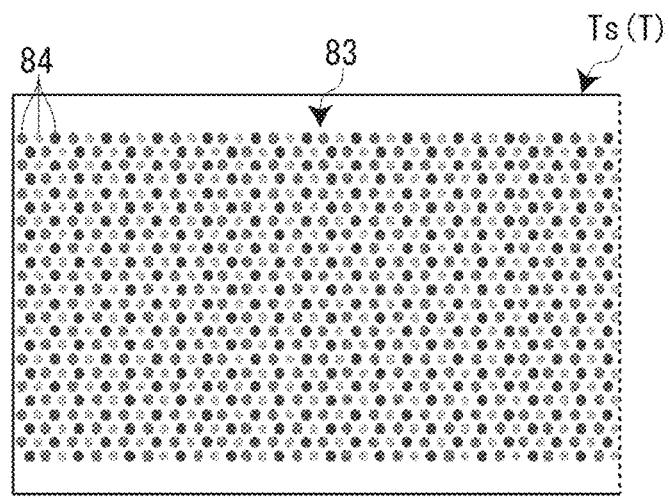
FIG. 4A is a plan view showing a special print tape according to a modification.
Figure 4B:
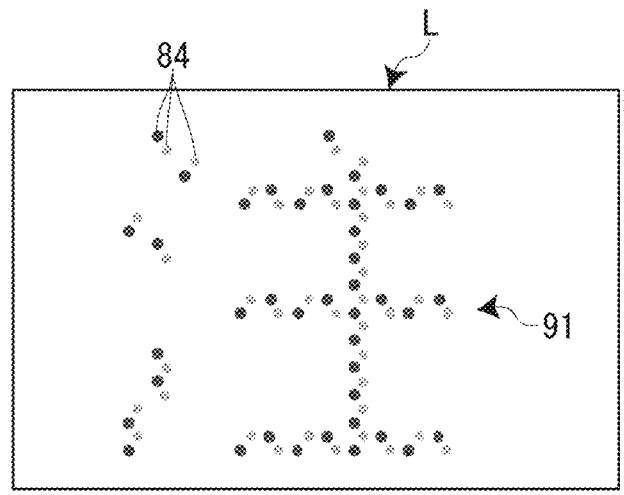
FIG. 4B is a plan view showing a preparation example of a label based on the special print tape according to the modification.

In the embodiment, the rectangular dots 84 are used as the dots 84. However, round dots 84 may be used, as shown in FIGS. 4A and 4B. Also, square dots 84 may be used.

In the embodiment, the special print tape Ts may further include a positioning mark for relative positioning in the feeding direction with respect to the label preparation device 1. In this case, the label preparation device 1 further includes a mark detection unit (detection unit) which detects the positioning mark. The control unit 51 causes the printing of the print data D including the overprinting to be carried out on the basis of the result of the detection by the mark detection unit. According to this configuration, overprinting of the dots 84 can be carried out accurately. The positioning mark may be formed on the front side of the special print tape Ts (surface of the recording tape 71) or may be formed on the back side of the special print tape Ts (surface of the release tape 72). The positioning mark may be formed in the form of a hole.

In the embodiment, the label preparation device 1 may further include a leading end detection unit which detects the leading end position of the special print tape Ts, and the control unit 51 may cause the printing of the print data D including the overprinting, using the leading end position detected by the leading end detection unit as a positioning reference for relative positioning in the feeding direction with respect to the label preparation device 1.

In the embodiment, the elongate tape having the recording tape 71 extending over the entire area in the direction of tape length is used as the special print tape Ts. However, as the special print tape Ts, a die cut tape on which the recording tape 71 is divided in the direction of tape length may be used. In this case, an end part (forward end and/or rear end) in the direction of tape length, of the divided recording tape 71, may be used as the positioning mark.

Moreover, a paper tape having only the recording tape 71 may be used as the special print tape Ts.

In the embodiment, each dot 84 is overprinted in the background color of the special print tape Ts and thus turned into the non-display state. However, the dot group 83 may be printed with a thermochromic ink which becomes decolorized by heating, and the print unit (print head 32 and tape feeding motor 37) may heat and decolorize each dot 84 and thus turn the dot into the non-display state. In this case, a thermo-sensitive printer is used as the label preparation device 1.

In the embodiment, the invention is applied to a thermal printer. However, this is not limiting. For example, the invention may also be applied to an ink-jet printer or laser printer. In this case, a print sheet is used as the "print medium" mentioned in the appended claims.

What is claimed is:

1. A printing device comprising:
   a labeling information forming unit which, on a print medium where a dot group having a plurality of dots is printed in advance, selectively turns a dot of the dot group into a non-display state, thereby forming labeling information including a dot pattern that includes dots of the dot group other than the dot in the non-display state,
   wherein
   each of the plurality of dots printed in advance is a different color than a background color of an area of the print medium where the dot group is printed, and
   the dot in the non-display state is a color matching the background color.

2. The printing device according to claim 1, wherein the plurality of dots includes a plurality of dots in respective component colors arranged and printed, and
   the labeling information forming unit selectively turns the dots in the respective component colors into the non-display state and thereby forms the labeling information including the component colors.

3. The printing device according to claim 1, wherein the plurality of dots are arranged and printed on the print medium in the shape of a matrix or in a zigzag shape.

4. The printing device according to claim 1, wherein a background color of at least an area where the dot group is printed, on the print medium, is a print color which is printable by the printing device, and
   the labeling information forming unit overprints the dot in the print color and thereby turns the dot into the non-display state.

5. The printing device according to claim 1, wherein the print medium has the dot group printed with a thermochromic ink which becomes decolorized by heating, and
   the labeling information forming unit heats and decolorizes the dot and thereby turns the dot into the non-display state.

6. The printing device according to claim 1, wherein the print medium has a positioning mark for relative positioning in a feeding direction with respect to the printing device,
   the printing device further comprises a detection unit which detects the positioning mark, and
   the labeling information forming unit turns the dot into the non-display state on the basis of a result of detection by the detection unit.

7. The printing device according to claim 1, wherein the plurality of dots are all printed on the same layer of the print medium.

8. The printing device according to claim 1, wherein
   the plurality of dots printed in advance include a plurality of different colors, and
   each of the plurality of dots is only one color of the plurality of different colors.

9. A printing method for a printing device, the method comprising,
   on a print medium where a dot group having a plurality of dots is printed in advance, selectively turning a dot of the dot group into a non-display state, thereby forming labeling information including a dot pattern that includes dots of the dot group other than the dot in the non-display state,
   wherein
   each of the plurality of dots printed in advance is a different color than a background color of an area of the print medium where the dot group is printed, and
   the dot in the non-display state is a color matching the background color.

10. A print medium comprising:
    a dot group having a plurality of dots printed in advance, wherein a dot of the dot group can be turned into a non-display state by a printing device, and labeling information including a dot pattern is formed as a dot of the dot group is selectively turned into a non-display state by the printing device, the dot pattern including dots of the dot group other than the dot in the non-display state,
    wherein
    each of the plurality of dots printed in advance is a different color than a background color of an area of the print medium where the dot group is printed, and
    the dot in the non-display state has a color matching the background color.

* * * * *